O. S. PRATT.
Improvement in Method of Throwing Horses.
No. 123,726.　　　　　　　　　　　　　　　　Patented Feb. 13, 1872.
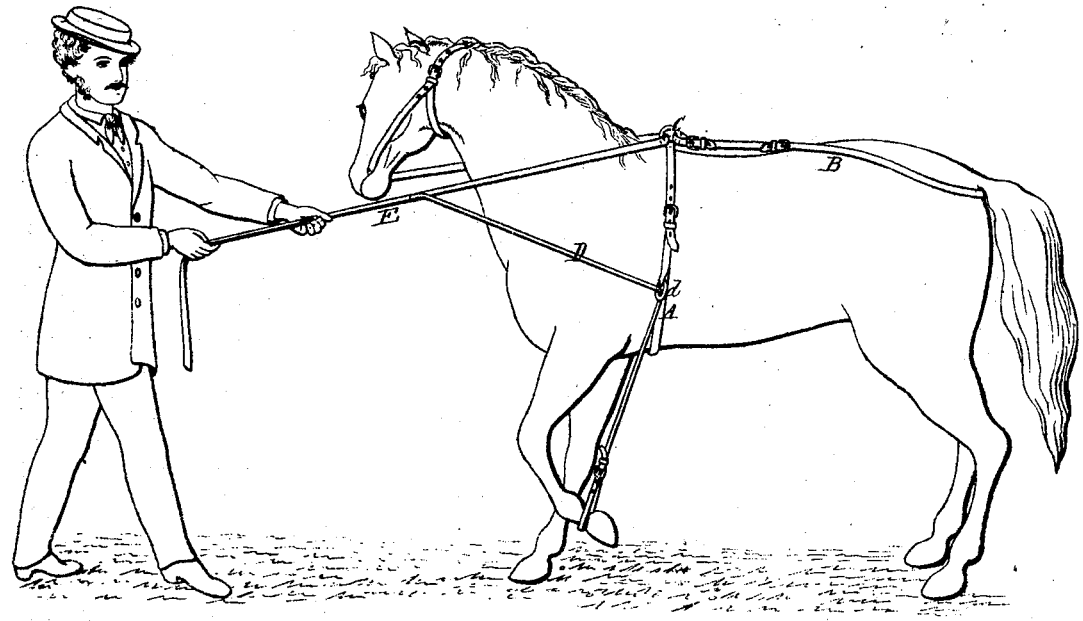
Witnesses.
Villette Anderson
E. M. Prater
Inventor.
O. S. Pratt.
Chipman Hosmer & Co.
Attys.

123,726

UNITED STATES PATENT OFFICE.

ORRIN S. PRATT, OF BATAVIA, NEW YORK.

IMPROVEMENT IN METHODS OF THROWING HORSES.

Specification forming part of Letters Patent No. 123,726, dated February 13, 1872.

*To all whom it may concern:*

Be it known that I, ORRIN S. PRATT, of Batavia, in the county of Genesee and State of New York, have invented a new and valuable Improvement in the Method of Throwing Horses; and I do hereby declare that the following is a full, clear, and exact description of the construction and operation of the same, reference being had to the annexed drawing making a part of this specification, and to the letters and figures of reference marked thereon.

Figure 1 of the drawing is a representation of a horse with throwing-rig applied.

This invention has relation to an improved method of throwing horses; and it consists in the construction and novel arrangement of the straps or ropes, as hereinafter described.

The letter A of the drawing designates a strong surcingle, which is placed around the horse about three inches back of the fore legs. B represents a strong crupper, which is connected with the surcingle, and at the point of junction an iron ring or loop, C, is secured in the straps or ropes. Instead of separate straps or ropes, a single rope may be employed to form the crupper, surcingle, and, if properly looped, the ring also. The knots should be tied so that they will not give or slip. The crupper and surcingle having been adjusted, as above described, if it be desired to throw the animal on his left side, the straps are disposed of in the following manner—to wit: The left fore leg is strapped up by means of a stout strap, D, which is passed back through a loop, d, attached to the left side of the surcingle, and buckled to the pastern between the hoof and fetlock. The forward end of the strap D is secured to another strap or rope, E. This strap is passed back on the left side of the horse's neck, then through the ring C, and is brought forward on the right side. It is then put into the animal's mouth, and, after being brought up his left cheek, is wound around his throat and securely buckled or tied, as clearly shown in the drawing. The forward end of the rope or strap E is held by the operator, who, by drawing it toward him, turns the horse's head to the right side, and at the same time raises his left fore leg, thereby compelling him to fall on his left side, which he does with an easy recline, and without shock or injury. The strap D is arranged in such a manner that the horse may be enabled to swing his leg forward and backward within limits, and by touching the ground with his knee break the fall.

One of the advantages of the simultaneous turning of the horse's head and raising of his leg is that all possibility of rearing up or saving himself is at once prevented; it being necessary, according to this method of throwing a horse, that both his head and leg must be restrained. To throw the horse on his right side the straps are merely changed in position, keeping the same relation.

By means of the arrangement of the straps D E, which, together, are under the immediate control of the operator, the horse is enabled to rise easily after being thrown, as, by releasing the hold on the straps, the animal is allowed the use of both fore legs. When the strap D is buckled to the surcingle the horse must either struggle in his efforts to gain his feet, or the strap D must be unbuckled, an operation rendered very difficult on account of the position of the animal.

What I claim as my invention, and desire to secure by Letters Patent, is—

The head-strap E and leg-strap D, attached together and arranged as described, in combination with the surcingle A, crupper B, and rings or loops C d, as and for the purpose specified.

In testimony that I claim the above I have hereunto subscribed my name in the presence of two witnesses.

O. S. PRATT.

Witnesses:
 JANIE KOLLOCK,
 I. P. W. KOLLOCK.